(12) United States Patent
Itoga

(10) Patent No.: US 7,237,800 B2
(45) Date of Patent: Jul. 3, 2007

(54) OCCUPANT PROTECTION SYSTEM

(75) Inventor: Yasuo Itoga, Hikone (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/224,111

(22) Filed: Sep. 13, 2005

(65) Prior Publication Data

US 2006/0076760 A1 Apr. 13, 2006

(30) Foreign Application Priority Data

Sep. 24, 2004 (JP) ............................. 2004-277489

(51) Int. Cl.
    *B60R 21/18* (2006.01)
(52) U.S. Cl. ..................................... 280/733
(58) Field of Classification Search ................ 280/733, 280/801.1, 806, 807
    See application file for complete search history.

(56) References Cited

U.S. PATENT DOCUMENTS

| | | | |
|---|---|---|---|
| 5,383,713 A * | 1/1995 | Kamiyama et al. | 297/471 |
| 6,131,951 A | 10/2000 | Chicken et al. | |
| 6,184,785 B1 * | 2/2001 | Midorikawa | 340/457.1 |
| 2004/0045757 A1 | 3/2004 | Midorikawa et al. | |
| 2006/0108787 A1 | 5/2006 | Czaykowska et al. | |

FOREIGN PATENT DOCUMENTS

| | | |
|---|---|---|
| EP | 1 566 307 A1 | 8/2005 |
| EP | 1 568 537 A1 | 8/2005 |
| JP | 2001-163183 | 6/2001 |
| JP | 2001-287622 | 10/2001 |
| JP | 2003-312439 | 11/2003 |
| WO | WO 2004/005080 A2 | 1/2004 |

* cited by examiner

*Primary Examiner*—Faye M. Fleming
(74) *Attorney, Agent, or Firm*—Foley and Lardner LLP

(57) ABSTRACT

A seatbelt webbing includes a shoulder part and a lap part. The shoulder part is a standard belt and at least part of the lap belt is an airbelt. In a front collision, a pretensioner of the shoulder part is activated, thereby retracting a specified length of the seatbelt webbing and tightening the shoulder part. As a result, part of the lap part slides through a hole of a seatbelt tongue toward the shoulder part, thereby correspondingly tightening the lap part. After a lapse of a predetermined period of time, an ignition control unit activates an inflator for the airbelt. Thus, the lap part is pulled and tightened by the inflation of the airbelt. Further, the inflation of the airbelt pulls part of the shoulder part through the hole of the tongue toward the lap part, thereby further tightening the shoulder part.

5 Claims, 3 Drawing Sheets

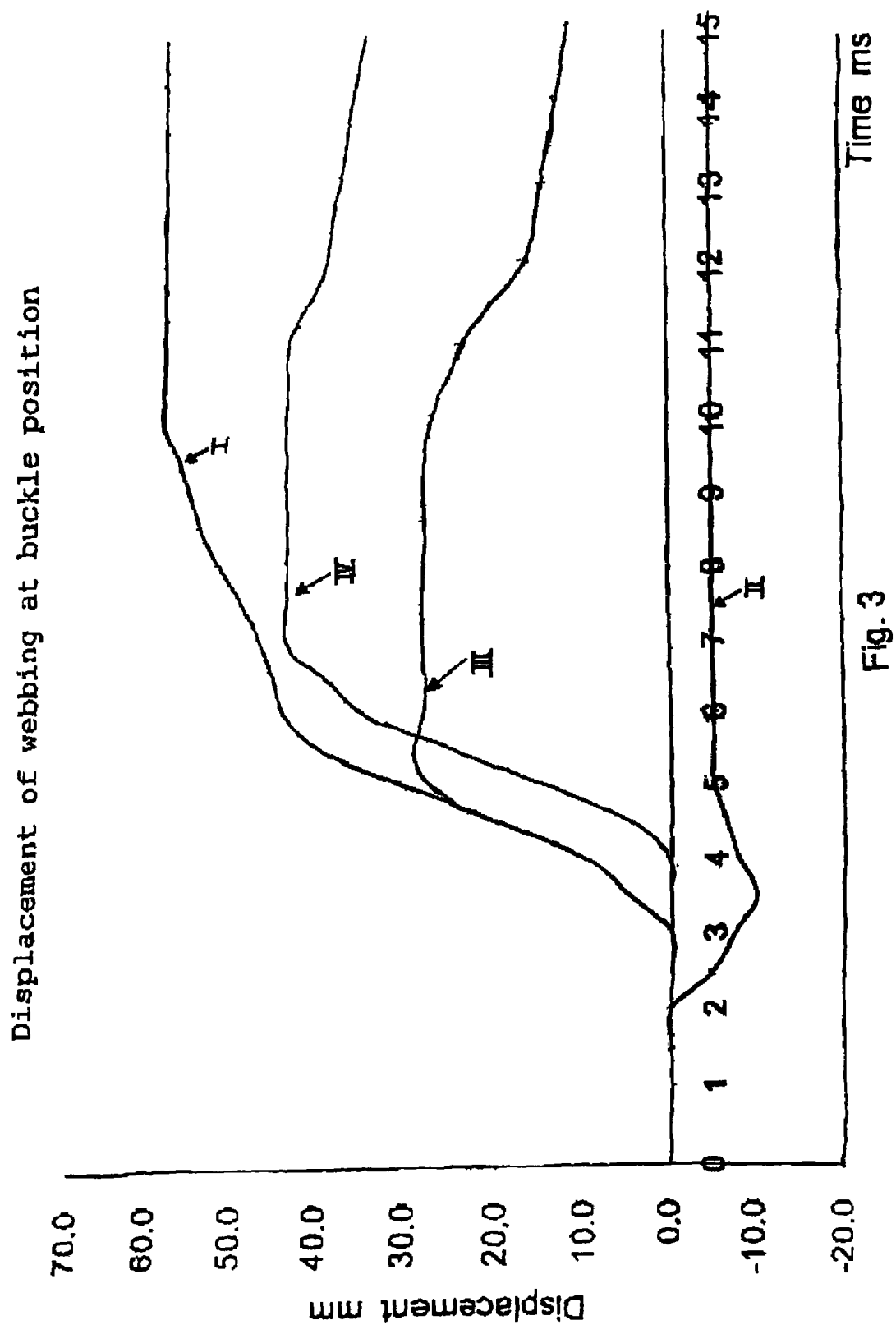

OCCUPANT PROTECTION SYSTEM

BACKGROUND

The present invention relates to an occupant protection system for protecting an occupant of a vehicle such as a car in an emergency situation such as a collision. More specifically, the present invention relates to an occupant protection system for protecting an occupant with a seatbelt system having an airbelt.

An airbelt seatbelt system is known in which part of a seatbelt webbing is constructed of an airbelt that expands in the event of a car emergency. One example of such an airbelt is disclosed in Japanese Unexamined Patent Application Publication No. 2003-312439 in which part of a shoulder part and part of a lap part are each constructed of an airbelt.

A seatbelt system that has a pretensioner that retracts one end of a seatbelt webbing to apply pretension thereto is also well known. One example of such a pretensioner is disclosed in Japanese Unexamined Patent Application Publication No. 2001-287622 in which both a shoulder part of the seatbelt webbing and a lap part thereof have their own pretensioners. The shoulder pretensioner is activated first, and after a lapse of a predetermined period of time (e.g., 10 ms), the lap pretensioner is activated.

Conventional seatbelt systems typically include a seatbelt webbing that passes through a tongue. The seatbelt webbing has a shoulder part, which is composed of a noninflating standard belt, and a lap part, which has an airbelt. If the system is provided with a pretensioner at the shoulder part and if the pretensioner and the airbelt inflator are activated at the same time, a first tension is generated by the retraction of the shoulder part by the pretensioner and a second tension is generated by the shortening force of the lap part by the inflation of the airbelt. Unfortunately, however, in the vicinity of the tongue, the tension generated by the retraction of the shoulder part competes against the tension generated by the shortening force of the lap part. As a result, the retraction of the shoulder part by the pretensioner often is not transmitted to the lap part.

Accordingly, the present invention has been made in light of the aforementioned problems. An object of the present invention to provide an occupant protection system, which includes a shoulder part constructed of a standard belt and a lap part at least part of which is constructed of an airbelt, which has a pretensioner that retracts the shoulder part in a car emergency, and which sufficiently transmits the retraction of the shoulder part to the lap part.

SUMMARY

An embodiment of the invention addresses an occupant protection system that includes, among other possible things: (a) a seatbelt tongue; (b) a seatbelt webbing that has a shoulder part and a lap part, the seatbelt webbing passing through the tongue; (c) a pretensioner that is configured to retract a specified length of the shoulder part in an emergency situation; (d) an airbelt that constricts at least part of the lap part; (e) an inflator that is configured to inflate the airbelt; and (f) an activator or control unit that is configured to activate the pretensioner and the inflator in the emergency situation. The activator is configured to activate the pretensioner first and then subsequently activate the inflator after a predetermined time delay.

In a further embodiment of this occupant protection system, the predetermined time delay may be between, e.g., about 3 ms and about 18 ms. Moreover, the length of the predetermined period of time may depend on the characteristics of the vehicle.

In the occupant protection system of the present invention, the pretensioner is first activated in a car emergency to retract a specified length of the shoulder part. Initially, as the airbelt is not inflated, the retraction of the shoulder part is applied also to the lap part. As a result, some of the lap part slides through the hole in the tongue, thereby moving slightly toward the shoulder part. Thereafter, the airbelt is inflated. As the airbelt is generally made of a material and a knitting structure that do not extend in length, when inflated the length of the lap part decreases whereas the width of the lap part increases. The shortening action due to the inflation of the airbelt decreases the length of the lap part, thereby moving a specified length of the webbing from the shoulder part through the hole in the tongue toward the lap part. Accordingly, both the lap part and the shoulder part are further tightened with the inflation of the airbelt. Moreover, as the airbelt characteristically maintains its inflation for a long time, the sufficiently tightened condition of the lap part and the shoulder part is likewise maintained for a long time.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 3 is a graph of the displacement of a seatbelt webbing at a buckle/tongue position versus time after detection of an emergency situation.

DETAILED DESCRIPTION

Embodiments of the present invention will be described with reference to the drawings. Like numbers are used throughout the drawings to refer to the same or similar parts and in each of the embodiments of the invention hereafter described.

Figure 1:
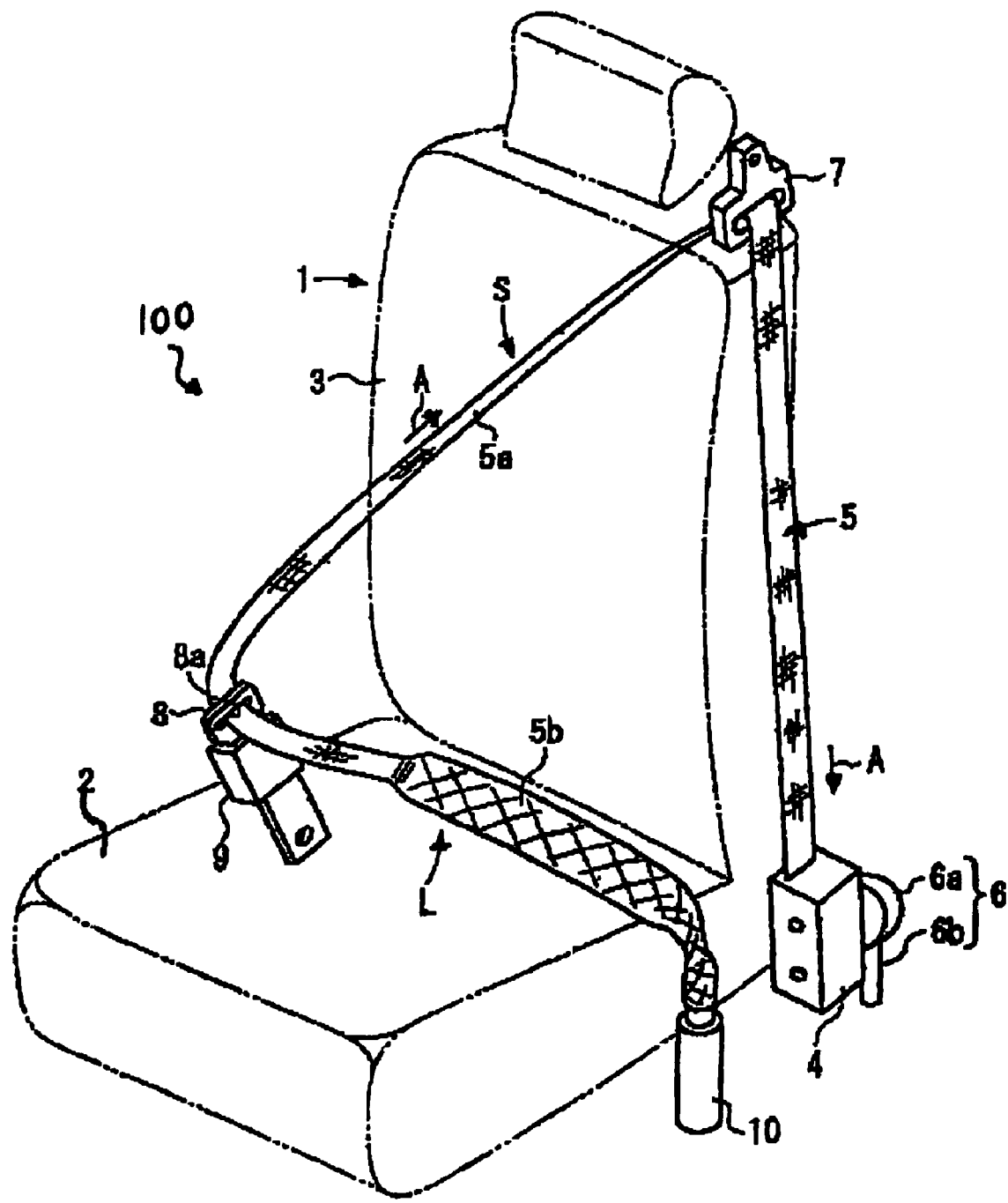
FIG. 1, which is a perspective view of a front seat of a car, shows an occupant protection system according to an embodiment of the present invention.
Figure 2:
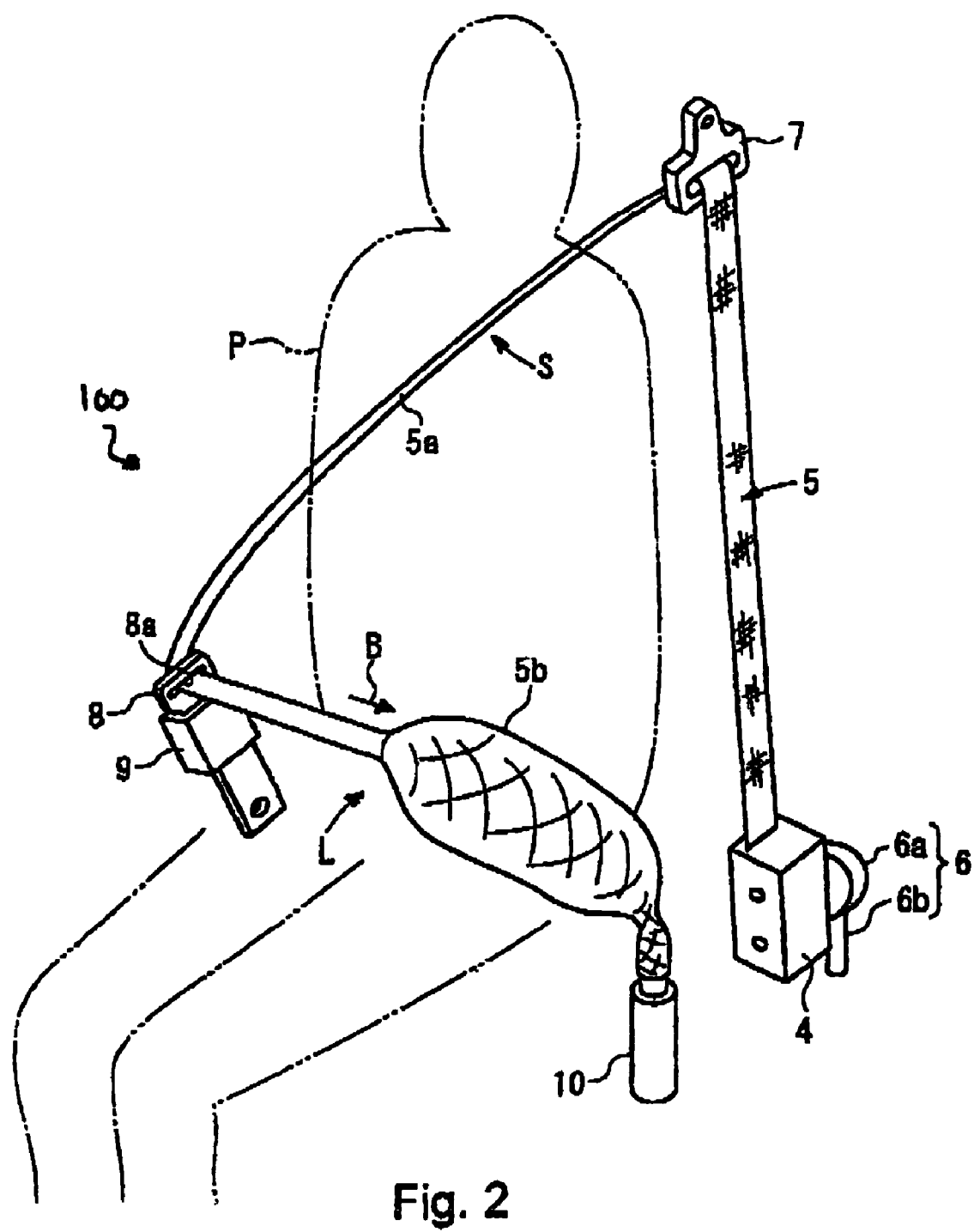
FIG. 2 is a perspective view of the occupant protection system of FIG. 1 with an airbelt inflated around a passenger.

FIG. 1, which is a perspective view of a front seat 1 (including a seat cushion 2 and a seatback 3) of a car, shows an occupant protection system 100 according to an embodiment of the present invention. FIG. 2 is a perspective view of the occupant protection system of FIG. 1 with an airbelt 5b inflated.

A seatbelt webbing 5 is formed of a combination of a standard belt 5a and an airbelt 5b, which are joined together by sewing or the like. A first end of the seatbelt webbing 5 (at the airbelt 5b end thereof) is connected to an inflator 10 that is disposed on one side of the seat 1. A second end of the seatbelt webbing 5 (at the standard belt 5a end thereof) is connected to a retractor 4 that is disposed on the same side of the seat 1 as the inflator 10.

The end of the seatbelt webbing 5 that is connected to the retractor 4 is connected such that it can be wound and unwound. The retractor 4 includes a spool (not shown) and a spring (not shown) for winding the webbing 5. The retractor also includes a lock mechanism (not shown) that locks the extraction of the webbing 5, when the acceleration (deceleration) of the car or the angular acceleration of the spool exceeds a specified level.

From the retractor 4, the seatbelt webbing 5 in order: (a) passes through a shoulder anchor 7, which is fixed to a B-pillar etc. of the car body; (b) passes through a hole 8a of a tongue 8; and (c) terminates at the inflator 10. The tongue 8 can be attached to, or detached from, a buckle 9 that is disposed on the side of the seat 1 opposite the retractor 4 and the inflator 10. The part of the seatbelt webbing 5 that extends between the retractor 4 and the tongue 8 is denoted a shoulder part S. The other part of the seatbelt webbing 5, i.e., the part that extends from the tongue 8 to the inflator 10 is denoted a lap part L.

The shown embodiment includes a pretensioner 6 that forces the spool to rotate strongly in an emergency, thereby winding the webbing 5 by a specified length. The pretensioner 6 includes an operation chamber 6a that accommodates a gas-pressure sensing member (not shown) and a gas generator 6b that supplies gas into the operation chamber 6a. When the gas pressure from the gas generator 6b is applied to the gas-pressure sensing member, the gas-pressure sensing member is displaced. The displacement of the gas-pressure sensing member causes the spool to rotate in a wind-up direction, thereby winding the seatbelt webbing 5 on the spool. The gas generator 6b of the pretensioner 6 and the inflator 10 are activated by an electric current from an ignition control unit (i.e., controller).

The operation of the above-described occupant protection system 100 will now be described.

When an occupant P (FIG. 2), who is sitting in the seat 1, inserts the tongue 8 into the buckle 9, the shoulder part S of the seatbelt webbing 5 is routed around the upper half of the occupant P and the lap part L of the seatbelt webbing 5 is routed around the occupant's waist. If the vehicle encounters an emergency situation such as, e.g., a frontal collision, the ignition control unit 20 first instructs the gas generator 6b of the pretensioner 6 to activate the pretensioner 6, thereby retracting a specified length of the seatbelt webbing 5 in the direction of arrow A in FIG. 1. As a result, the shoulder part S is tightened by being moved in the direction of the arrow A. Correspondingly, part of the lap part L passes through the hole 8a of the tongue 8 toward the shoulder part S, thereby tightening the lap part L.

After a lapse of a predetermined period of time (e.g., 3 ms to 18 ms), which is later discussed with respect to FIG. 3, the ignition control unit 20 activates the inflator 10. When the gas from the inflator 10 flows into and inflates the airbelt 5b, the length of the airbelt 5b decreases, as shown in FIG. 2. Specifically, as the airbelt 5b is formed of a woven material that is substantially fixed in length, when the airbelt 5b increases in diameter with inflation, the length of the airbelt 5b correspondingly decreases. As a result of the inflation of the airbelt 5b, the lap part L is further tightened. Moreover, the tightening of the lap part L pulls the standard belt 5a in the direction of arrow B in FIG. 2 such that part of the shoulder part S is pulled through the hole 8a in the tongue 8, thereby further tightening the shoulder part S.

As the airbelt 5b can keep its inner pressure longer than common airbags, the airbelt 5b draws the standard belt 5a for a relatively long time. The shoulder part S and the lap part L are, therefore, maintained in high tension for a long time, thereby providing sufficient protection for the occupant.

FIG. 3 is a graph of the displacement of a seatbelt webbing at a buckle/tongue position versus time, after detection of an emergency situation. In the figure, curve I is a graph of the displacement of the seatbelt webbing 5 when only the shoulder pretensioner 6 is activated upon detection of an emergency situation, i.e., at time t=0 ms (which may, in actually, be about 10 ms after the emergency situation due to the time taken to detect the emergency situation which is usually about 10 ms, i.e., "time-to-trigger"). As can be seen in this curve I, the seatbelt webbing 5 begins to move toward the retractor 4 (i.e., in the positive direction) at about 3 ms. Moreover, after about 10 ms, the seatbelt webbing 5 moves about 60 mm (i.e., 6 cm) toward the retractor 4.

In contrast to curve I, curve II is a graph of the displacement of the seatbelt webbing 5 when both the pretensioner 6 and the inflator 10 are activated upon detection of an emergency situation, i.e., at time t=0 ms (which, again, may, in actually, be about 10 ms after the emergency situation due to the 10 ms time-to-trigger). As can be seen in this curve II, the seatbelt webbing 5 begins to move toward the inflator 10 (i.e., in the negative direction) at about 2 ms. As a result, in this curve II, the seatbelt webbing 5 not only moves toward the inflator 10 but it does so at an earlier time as compared to the preceding curve I.

In light of the foregoing, if the shoulder pretensioner 6 is activated upon detection of an emergency situation and then, after a predetermined time delay, inflator 10 begins to inflate the airbelt 5b, the seatbelt webbing 5 can initially move in the positive direction toward the retractor 4 and then be retarded by the inflation of the airbelt 5b. Specifically, as shown in curve III, if the pretensioner 6 is activated upon detection of an emergency situation and then about 3 ms thereafter (i.e., when the seatbelt webbing would otherwise begin to move toward the retractor 4) the inflator 10 is activated, the displacement of the seatbelt webbing 5 is limited to about 30 mm (i.e., 3 cm) toward the retractor 4, which is roughly half of the displacement in curve I.

Similarly, the overall displacement of the seatbelt webbing 5 toward the retractor 4 can also be limited by delaying both the activation of the pretensioner 6 and the inflation of the airbelt 5b, provided the delay for the latter is longer. For instance, as shown in curve IV, if the activation of the pretensioner 6 is delayed for about 1 ms (which may, in actually, be about 11 ms after the emergency situation due to the 10 ms time-to-trigger) after detection of an emergency situation and the activation of the inflator 10 is delayed about 5 ms after detection of the emergency situation (which may, in actually, be about 15 ms after the emergency situation due to the 10 ms time-to-trigger), a 4 ms net differential exists between the activation of the pretensioner 6 and the inflator 10. Moreover, as a result of this 4 ms differential, the seatbelt webbing 5 moves about 40 mm (i.e., 4 cm) toward the retractor 4.

In light of the foregoing, it is clear that a delay between activation of the pretensioner 6 and the inflation of the airbelt 5b facilitates limiting the displacement of the tongue/buckle portion of seatbelt webbing 5 toward the retractor 4 while also preventing a displacement thereof toward the inflator 10. As a result, the occupant protection system 100 sufficiently and effectively transmits the retraction of the shoulder part S to the lap part L.

Although the foregoing described 3 ms (curve III) and 4 ms (curve IV) delays between the activation of the pretensioner 6 and the inflation of the airbelt 5b, the delay is not open ended. Rather, a maximum delay of about 18 ms is typically imposed by cooperating functionality with a steering wheel or passenger airbag. Specifically, as steering wheel and passenger airbags typically inflate within 40 ms of an emergency situation, the occupant protection system 100 must be fully activated and deployed within that 40 ms time period. Moreover, due to the 10 ms time-to-trigger delay and the roughly 12 ms necessary to inflate the airbelt 5b, the delay until activation of the inflator 10 can be no longer than about 18 ms, i.e., 40 ms–10 ms–12 ms=18 ms. Moreover, if the maximum 18 ms delay is chosen, the pretensioner 6 should be activated no later than 15 ms after detection of the emergency situation (i.e., 25 ms after the emergency situation when including the 10 ms time-to-trigger), to preserve the at least 3 ms differential between the activation of the pretensioner 6 and the activation of the inflator 10.

The above-described embodiment is merely an example of the invention and the invention is not limited to such embodiment. For example, the buckle 9 may also include a pretensioner. Similarly, a lap pretensioner, which applies pretension to the airbelt 5b by downwardly pulling the inflator 10, may also be provided. Further, although the ignition timing of any such buckle pretensioner and/or lap pretensioner in an emergency be the same as that of the retractor pretensioner, they may be slightly shifted in time. Moreover, when any such various pretensioners are added, the amount of retraction of the webbing by the pretensioners may be set relatively small.

By way of another (or further) example, it should be readily recognized that although the shown pretensioner 6 is one that winds the webbing 5 on the spool, other pretensioners may be used and, therefore, the invention is not limited to the shown pretensioner 6.

By way of another (or further) example, a seat bag system (not shown) may be disposed under the front of the seat cushion 2. As a result, a forward movement of the lower half of the occupant P can be prevented by lifting or hardening the front of the seat cushion 2, e.g., by inflating the seat bag under the seat cushion in the event of a frontal collision.

By way of another (or further) example, a driver airbag system or a passenger airbag system (not shown) may be provided in front of the seat 1. The airbag(s) may also inflate in an emergency situation.

The priority application, Japanese Application No. 2004-277489, which was filed on Sep. 24, 2004, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure that are within the scope and spirit of the present invention are to be included as further embodiments of the present invention. The scope of the present invention is to be defined as set forth in the following claims.

What is claimed is:

1. An occupant protection system comprising:
   a seatbelt tongue;
   a seatbelt webbing that has a shoulder part and a lap part, the seatbelt webbing passing through the tongue;
   a pretensioner that is configured to retract a specified length of the shoulder part in an emergency situation;
   an airbelt that constricts at least part of the lap part;
   an inflator that is configured to inflate the airbelt; and
   an activator configured to activate the pretensioner and the inflator in the emergency situation, wherein the activator is configured to activate the pretensioner first and then subsequently activate the inflator after a predetermined time delay.

2. The occupant protection system according to claim 1, wherein the predetermined time delay is between about 3 ms and about 18 ms.

3. The system of claim 2, wherein the predetermined time delay is between about 6 ms and 15 ms.

4. The system of claim 2, wherein the predetermined time delay is between about 6 ms and 18 ms.

5. The system of claim 2, wherein the predetermined time delay is between about 3 ms and 15 ms.

\* \* \* \* \*